(12) United States Patent
Lhospitalier

(10) Patent No.: US 9,242,512 B2
(45) Date of Patent: Jan. 26, 2016

(54) TREAD WITH BLOCKS

(75) Inventor: Sylvie Lhospitalier, Ennezat (FR)

(73) Assignees: COMPAGNIE GENERALE DES ETABLISSEMENTS, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1240 days.

(21) Appl. No.: 13/133,145

(22) PCT Filed: Dec. 2, 2009

(86) PCT No.: PCT/EP2009/066216
§ 371 (c)(1),
(2), (4) Date: Sep. 21, 2011

(87) PCT Pub. No.: WO2010/063753
PCT Pub. Date: Jun. 10, 2010

(65) Prior Publication Data
US 2012/0000585 A1  Jan. 5, 2012

(30) Foreign Application Priority Data

Dec. 5, 2008 (FR) ...................................... 08 58302

(51) Int. Cl.
*B60C 11/12* (2006.01)
*B60C 11/11* (2006.01)

(52) U.S. Cl.
CPC ............... *B60C 11/12* (2013.01); *B60C 11/124* (2013.04); *B60C 11/1218* (2013.04); *B60C 2011/1254* (2013.04)

(58) Field of Classification Search
CPC .... B60C 11/11; B60C 11/12; B60C 11/1204; B60C 11/1218; B60C 11/1222; B60C 11/1236; B60C 2011/1254; B60C 11/124; B60C 11/032; B60C 11/24

USPC .......... 152/209.18, 209.25, 209.17, 210, 211, 152/154.2, 902
See application file for complete search history.

(56) References Cited

U.S. PATENT DOCUMENTS 2,100,084 A  11/1937 McNeill
2,339,558 A   1/1944 Hale
(Continued)

FOREIGN PATENT DOCUMENTS

DE  41 07 647 A1  9/1991
DE  44 26 950 A1  2/1996
(Continued)

OTHER PUBLICATIONS

International Search Report mailed Mar. 4, 2010 for International Application No. PCT/EP2009/066216.

*Primary Examiner* — Eric Hug
(74) *Attorney, Agent, or Firm* — Dickinson Wright PLLC

(57) ABSTRACT

Tire tread comprising a plurality of rubber pads, each rubber pad being delimited by an incision of depth and of closed contour, this tread having:
 on a first portion, of a depth at most equal to 60% of the depth of the incision, blocking means designed to limit the movements of the lateral wall relative to the wall facing it,
 and on a second portion of the incision, of a depth at most equal to 60% of the depth of the incision and extending the first portion of depth, geometric shapes of second amplitude or that are rectilinear (that is to say of zero amplitude), the second amplitude being less than the first amplitude,
 and, the first portion of the incision delimiting a first portion of pad and the second portion of the incision delimiting a second portion of pad, the maximum sectional surface area of the second portion of the pad is greater than the maximum sectional surface area of the first portion of the said pad.

11 Claims, 3 Drawing Sheets

(56) References Cited

U.S. PATENT DOCUMENTS

| | | |
|---|---|---|
| 6,263,934 B1 | 7/2001 | Auxerre et al. |
| 2010/0307650 A1* | 12/2010 | De Benedittis et al. . 152/209.18 |

FOREIGN PATENT DOCUMENTS

| | | | |
|---|---|---|---|
| EP | 0 664 230 A2 | | 7/1995 |
| EP | 0 968 848 A1 | | 1/2000 |
| FR | 2921586 | * | 4/2009 |
| JP | 63-291704 A | | 11/1988 |
| JP | 63-297107 A | | 12/1988 |
| JP | 11-165507 A | | 6/1999 |
| JP | 2003-104012 A | | 4/2003 |
| JP | 2006-347468 | * | 12/2006 |

* cited by examiner

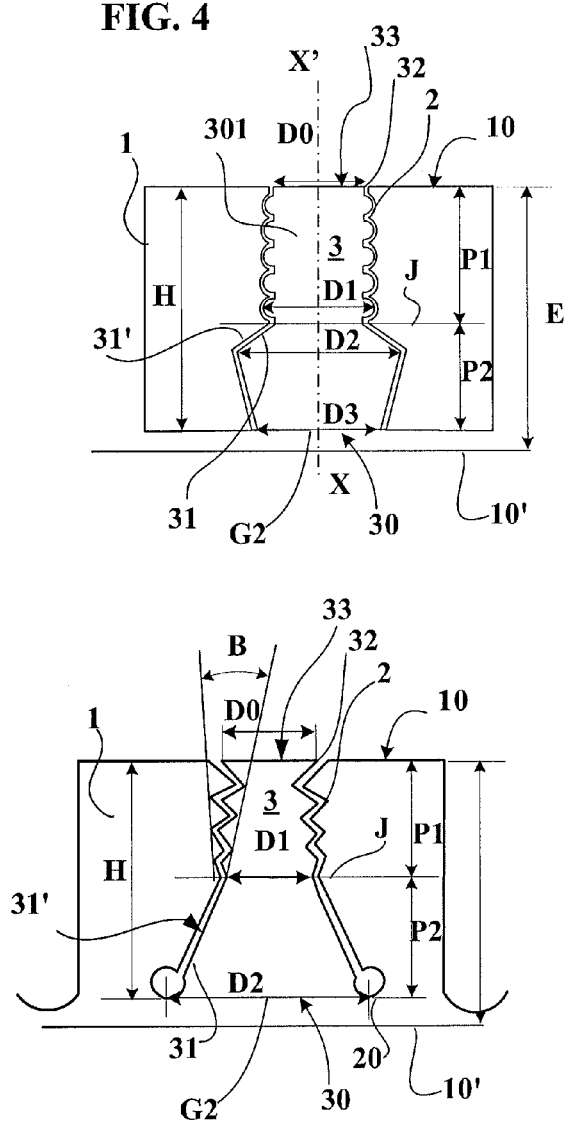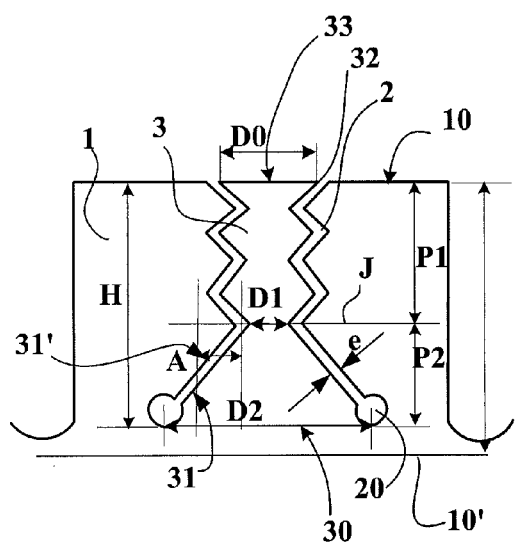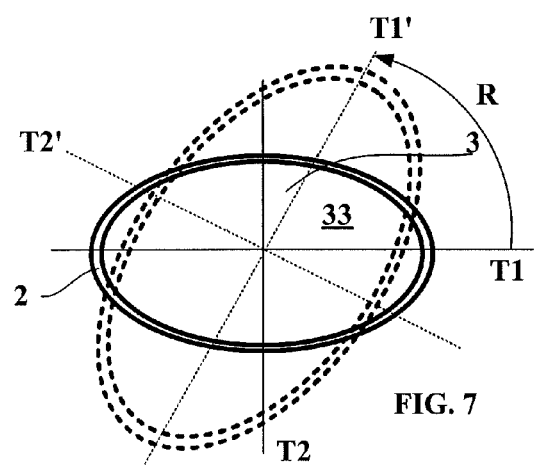
FIG. 4
FIG. 5
FIG. 6
FIG. 7

TREAD WITH BLOCKS

The invention relates to tire treads and in particular a sculpture for such treads comprising a new incision geometry conferring on the said treads an improvement in performance in grip on water-covered ground but without reducing service life due to wear.

The invention relates to treads designed for the manufacture of new tires or for the retreading of tires, and in particular the sculptures for the said treads comprising a large number of cuts taking the form of grooves and/or of incisions. "Incision" in the present description means a cut of virtually zero width and in any case a width of less than or equal to 2 mm, while a groove is a cut with a width greater than 2 mm.

It is known from Patent Application JP 2003104012-A1, in order to obtain a good grip on wet ground, to make an incision the path of which on the rolling surface is of square shape and closed in blocks of rubber of a tread, having the same depth as the grooves delimiting the said blocks.

It is also known practice, for example in U.S. Pat. No. 2,100,084, U.S. Pat. No. 2,339,558, to make incisions the path of which on the rolling surface of the tread is of closed circular shape of constant diameter making it possible to have effective ridges in all the directions tangential to the rolling surface. Each of these incisions delimits and isolates a rubber pad (the cross section of which has relatively small dimensions compared with the width of the tread) only connected to the tread at its base, that is to say the portion of the pad furthest from the rolling surface. This rubber pad is compressed during contact with the ground and also subjected to forces acting tangentially to the surface of contact with the ground during rolling, the latter forces tending to deform it both in shearing and in bending. This rubber pad is slightly inclined relative to the perpendicular to the rolling surface which, because of the bending of the pad, causes the incision that delimits it to open.

Patent DE 4107547-C2 describes a tread which comprises an incision the path of which on the rolling surface is circular and closed, of constant diameter in the depth and which is inclined, relative to a perpendicular to the rolling surface, over a portion of its height at an angle that can go from 20° to 60°, then at a lesser angle that can go up to 20° on the portion furthest from the rolling surface. This incision delimits a pad of material. The change in inclination of the circular incision occurs at approximately one third of the depth of the grooves with which the tread is provided.

Patent Application DE 4426950-A1 describes a tread which comprises incisions of closed circular shape and of constant diameter; each of these incisions delimits and isolates a pad the surface of which is inclined relative to a perpendicular to the rolling surface, this surface being offset radially towards the inside of the rolling surface in order to prevent the pad being torn off during the service life of the tire furnished with such a tread.

Patent EP 0664230-B1 describes a tread which comprises incisions the path of which on the rolling surface is for example of closed circular shape; each of these incisions delimits and isolates a rubber pad the perimeter of which, measured over the whole surface parallel to the rolling surface, continually increases over at least a portion of its height and then decreases while remaining greater than the perimeter of the pad at the rolling surface in order to reduce problems during stripping and to reduce the risk of seeing the surface of the pads protrude relative to the rolling surface.

The solutions of the prior art described above all relate to incisions that are not blocking, that is to say incisions of which the walls delimiting them do not comprise means reducing or removing the relative movements of one wall relative to the wall facing it. The result of this is that the deformations of the pad result in hysteretic losses which lead to an increased rolling resistance and in irregular wear, notably around the pads. "Irregular wear" in this instance means wear that is not uniform over the whole rolling surface, that is to say wear that is locally greater than over the whole of the tread.

"Service life" of a tire tread must be understood to be the period of use of the said tread before the wear reaches a wear limit involving a removal of the tire for replacement or for retreading.

One of the objectives of the invention is to propose a tread provided with a plurality of rubber pads delimited by blocking incisions and of which the rolling resistance and the resistance to uneven wear is improved relative to the treads of the prior art, but without reducing the service life concerning wear and of which the stripping is made easier and does not cause the pads to protrude relative to the rolling surface in the new state.

This objective is achieved by virtue of a tire tread having a thickness E and provided with a rolling surface designed to come into contact with the road surface during running, this tread comprising a plurality of rubber pads with a median axis XX' cutting the rolling surface of the tread. Each rubber pad has a height H at most equal to the thickness E of the tread and comprises a lateral wall running round the said pad about the median axis XX', this lateral wall cutting the rolling surface along a ridge the path of which on the rolling surface is closed, this ridge delimiting a face of contact of the pad with the road surface. Each pad comprises a base situated at the distance H from the face of contact of the said pad with the road surface.

The lateral wall of each pad is connected at its base to the inside of the tread by a connection portion for connection to a wall facing it, the said lateral wall and wall facing it delimiting an incision of average width e and with a depth equal to the height H of the pad.

Moreover, the lateral wall of each pad and the lateral wall facing this lateral wall on the tread comprise, on a first portion of the incision, of a depth P1 at most equal to 60% of the depth H of the incision, means designed to limit the movements of the lateral wall relative to the wall facing it, the said means consisting of geometric shapes of first amplitude provided in order to interconnect with or fit into the geometric shapes provided on the other wall facing it, and on a second portion of the incision, of a depth P2 at most equal to 60% of the depth H of the incision and extending the first portion of depth P1, geometric shapes of second amplitude or that are rectilinear (that is to say of zero amplitude), the second amplitude being less than the first amplitude.

Moreover, the first portion of the incision of depth P1 delimiting a first portion of pad and the second portion of the incision of depth P2 delimiting a second portion of pad, the area of the maximum section of the second portion of the pad is greater than the area of maximum section of the first portion of the said pad. Section means the path of the pad obtained on a sectional plane cutting the said pad on a plane perpendicular to the median axis XX' of the pad. "Maximum section" means the path of the pad that has a maximum area for the portion in question of the pad.

The median axis XX' cuts the rolling surface of the tread in a direction that is perpendicular or else a direction that is oblique (that is to say not perpendicular) to the said surface.

According to one embodiment of the invention, the geometric shapes of the incision delimited by the lateral wall of each pad and the lateral wall facing it of the tread, in cross section, have a path in a broken line or in a zigzag of great amplitude over the first portion of a depth at most equal to 60% of the height of the pad, and those of the second portion have an undulating path of small amplitude and of great wave length or which is rectilinear over a depth at most equal to 60% of the height of the pad. For any sectional plane perpendicular to the rolling surface, the line segment joining the end of the incision on the rolling surface in the new state and the innermost point of the tread has an inclination such that the surface area of the base of the pad is greater than the surface area of contact of the pad situated at the surface of contact of the tread.

Each incision is defined by the space delimited mainly between two main walls facing one another, the said walls being perpendicular to or oblique to the rolling surface. Advantageously, for treads designed for heavy goods vehicles, the width of an incision delimiting a rubber pad is less than 2 mm and preferably between 0.05 mm and 2 mm.

"Median axis XX' of a rubber pad delimited by a closed incision" means a line segment connecting the geometric barycentre of the base of the pad, that is to say the portion of the pad furthest into the tread, to the geometric barycentre of the surface of contact of the pad with the road surface; this direction makes an angle of 90° with the rolling surface when the rubber pad is perpendicular to this surface.

A tread sculpture comprising incisions delimiting the rubber pads according to the invention, in addition to the advantage of having a great length of active ridges in contact with the ground, has the advantage of significantly delaying the time when uneven wear appears on the surface of the tread around the incisions. This invention allows the said tread to be effectively and more easily stripped from the mould without tearing of rubber after curing because of the significant limitation of the forces that tend to pull the pads out of the tread at the time of stripping.

As is known in the prior art, molding elements are used to mould the incisions in a tread. In the case of the invention, the molding element used to mould this type of incision comprises a widened portion (molding the second portion of the pad) which, when it is extracted from the tread, allows the first portion of the pad to resume its position in the tread so that the face of contact of the pad is at most at the same level as the rolling surface (that is to say that this face of contact of the pad does not protrude relative to this surface).

The first portion of the incision comprises means (broken line or zigzag or undulations of great and first amplitude) which make it possible during the first portion of the service life of the tread to limit the movements depthwise, by fitting together, of the lateral wall of the pad relative to the wall facing the rubber of the tread.

All of these features taken in combination make it possible to prevent the pads remaining in protrusion relative to the surface of the tread and thus make it possible to prevent the pads being torn out of the tread during the service life of the tire.

A sculpture according to the invention also allows a gain in rolling resistance because of the limitation of the hysteretic losses associated with the cyclic deformations of the pads of the tread.

According to a preferred variant embodiment, the amplitude of the path in a broken line of the first portion of the pad decreases in the depthwise direction.

According to another variant embodiment, the area of the face of contact of the pad increases continuously from the surface of junction between the first portion of pad and the second portion of pad. Thus, the surface area of the maximum section is, beneath the surface of junction, smaller than the surface area of the minimum section of the second portion of the incision.

According to another variant embodiment, the maximum surface of contact of the pad seen in cross section of the first portion of the pad is greater than the surface area in contact with the road surface and advantageously the maximum surface of contact is at the point of junction of the first with the second portion of the pad.

According to another variant embodiment, the wall of the second portion of the pad has no means interacting mechanically with the wall facing it over a depth situated at a distance from the surface of contact of the pad of between 75% and 100% of the height of the pad, that is to say close to the base of the pad.

According to another variant embodiment, the second portion of pad can if necessary comprise means for interacting mechanically with the wall facing it. In this case, these means are chosen to have an amplitude smaller than those of the means provided on the first portion so as not to create blockage at the time of stripping that may lead to the pad protruding from the rolling surface.

According to a preferred embodiment, each incision is terminated in its radically innermost portion of the tread, that is to say at the end delimiting the base of the pad, by a widened portion forming a channel surrounding the pad, this channel having a maximum width that is greater than the width e of the incision. The base of the pad corresponds in this case to the portion furthest into the tread limited by this channel. The presence of this cord has a favorable action in allowing good stripping of the tread.

According to another embodiment, the median axis XX' of the pad is slightly inclined relative to a perpendicular to the rolling surface, that is to say forming an angle at most equal to 10° with this perpendicular, and preferably inclined at an angle of 5°.

In order to allow a better understanding of the invention and of its advantages, several variant embodiments of the invention are now described by means of the following figures:

FIG. 4 shows a third variant of a pad according to the invention, in which the second portion of pad is bi-frustoconical;

FIG. 5 shows a fourth variant according to which the end of the incision delimiting a pad is formed by a channel surrounding the pad;

FIG. 6 shows a fifth variant according to which the first portion of pad has a decreasing variation of the zigzag of its wall in sectional view;

FIG. 7 shows a sixth variant according to which the incision delimiting a pad is of elliptical shape.

To make the figures and the description easy to read, one and the same reference is used in the figures when it designates one and the same functional and/or structural element.

Figure 1A:
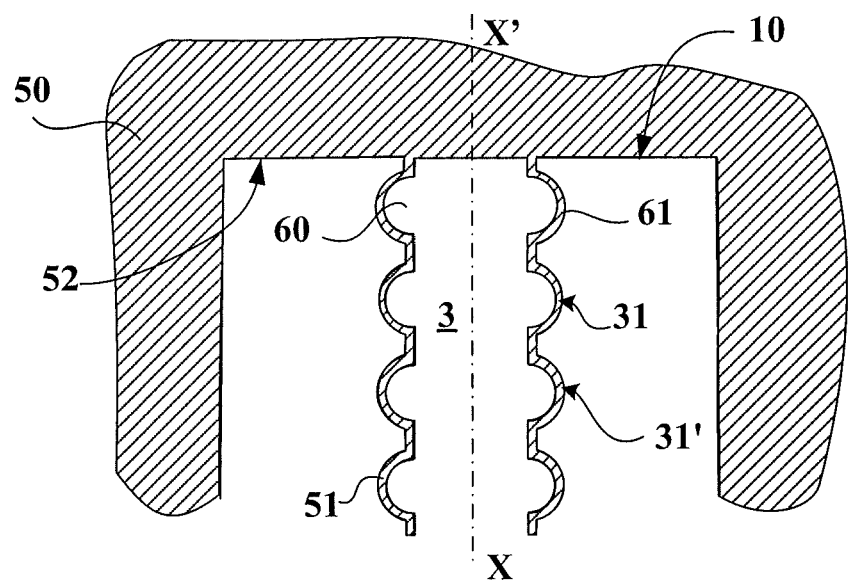
FIG. 1A shows an element of a tread and a portion of mould for molding a rubber pad according to the prior art.

FIG. 1A shows an element 1 of a tread according to the prior art, this element 1 comprising a closed incision 2 delimiting a rubber pad 3. Shown here is a portion of mould 50 comprising a molding element 51 protruding on the molding surface 52, this molding element being in place in the material comprising the tread in order to mould a blocking incision 2 and delimiting a pad 3 with a median axis XX' perpendicular to the rolling surface. This incision is called blocking because the walls 31 and 31' that delimit it comprise blocking means designed to interact together so as to limit the relative movements of one wall relative to the other. The blocking means are in this instance reliefs 61 on the lateral wall 31 of the pad and hollows 60' on the wall 31' facing it.

Figure 1B:
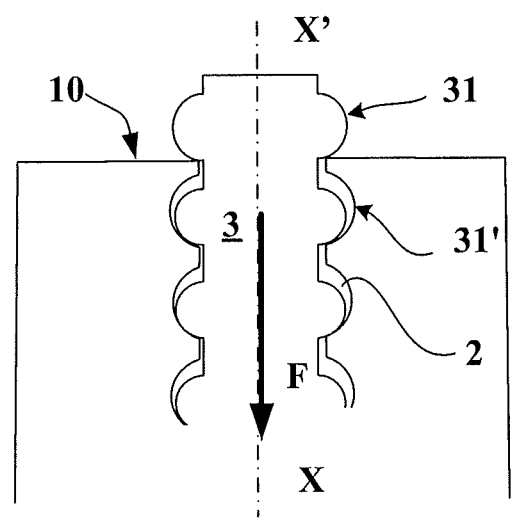
FIG. 1B shows the element of tread of FIG. 1 with a rubber pad protruding on the rolling surface after stripping.

It has been found that this configuration was not retained on the tread after stripping and that it was possible to obtain the configuration shown in FIG. 1B. In this configuration, the molding element used to mould the incision and thus the walls of the pad and the walls facing it drew the pad 3 with it during stripping to the outside of the rolling surface 10 of the tread. Because of the elasticity of the rubber, there is a return force F which tends to bring the pad into a position corresponding to that of FIG. 1A. However, at the equilibrium between the return forces and the blocking forces generated by the blocking means 61 and 61' themselves, the pad may remain partially protruding on the outside of the tread as can be seen in this FIG. 1B. This is particularly unfavorable in visual appearance and in performance with respect to wear since more pronounced wear occurs on the protruding pads, and rubber is even torn off in certain running conditions.

Figure 2A:
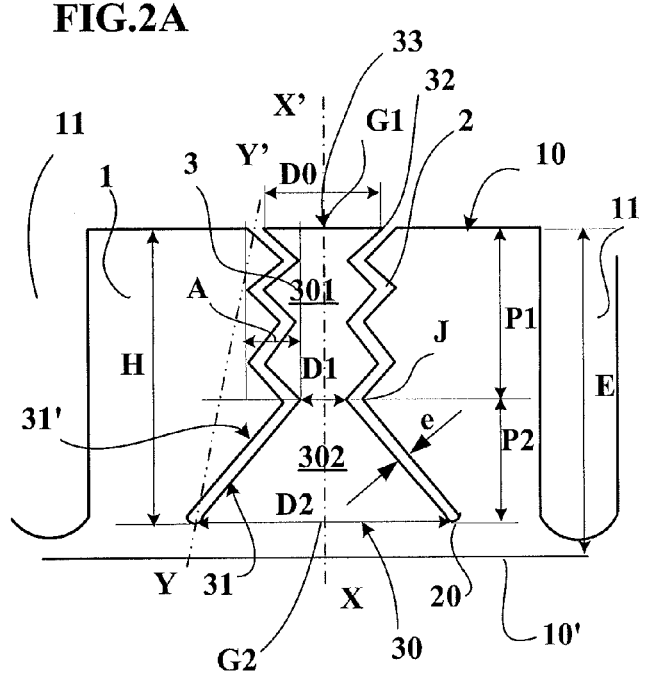
FIG. 2A shows in section a portion of tread comprising a pad according to a first variant of the invention.

FIG. 2A shows in section a portion of a tread 1 for a tire of dimension 315/70 R22.5, the said tread 1 having a thickness E (in this instance equal to 17.5 mm) measured in the new state as the distance separating the rolling surface 10 designed to come into contact with the road surface during running and an inner surface 10' designed to be applied to the surface radially outside a tire blank. This section is made in a plane containing the rotation axis of the tire.

The tread 1 according to the invention is provided with a sculpture formed by grooves 11 and by incisions. At least some of these incisions are incisions 2 the path of which on the rolling surface has a closed contour. Each of these incisions delimits, in the tread, a rubber pad 3 comprising a lateral wall 31 running round the pad 3. The incision 2 has a depth H at most equal to the thickness E of the tread, in this instance equal to 17.5 mm. The intersection of the lateral wall 31 with the rolling surface forms a ridge 32 delimiting a face of contact 33 of the pad. Each rubber pad 3 comprises a base 30 (the portion furthest inside the tread and situated at a distance equal to the depth of the incision 2) for which this pad 3 is connected to the tread 1 and has a median axis XX' cutting the rolling surface 10 of the tread. This median axis XX' is an imaginary straight line passing through the geometric barycentres G1, G2 of the face of contact 33 of the pad 3 and of the base 30 of the said pad.

The lateral wall 31 of each pad 3 is connected at the base of the pad 30 to a facing wall 31' by a connection portion 20. The lateral wall 31 of the pad 3 and the facing wall 31' delimit an incision 2 with an average width e equal, in the present case, to 0.5 mm. The pad 3 has a geometry of revolution about the axis XX': it is intended here that the geometry on any other sectional plane containing the axis XX' is substantially identical to that which is shown with this FIG. 2A.

In the situation shown, the pad 3 comprises, starting from the rolling surface of the tread in the new state, a first portion of pad 301 extended by a second portion of pad 302. The first portion of pad 301 is of cylindrical shape with an axis XX' and comprises as can be seen in this FIG. 2A a zigzag path designed to interact with a matching zigzag path on the wall facing it. The blocking means provided on the first portion of the incision 2 have a non-zero amplitude A.

This first portion of pad comprises a maximum section of diameter D0 (in the present case D0 is equal to 6 mm) and a section of minimum area of diameter D1. The maximum diameter D0 is measured on the rolling surface while the minimum diameter D1 (in the present case D1 is equal to 5.4 mm) is measured at the depth P1 corresponding to the innermost points of the tread (in this instance P1 is equal to 60% of H, or 10.5 mm).

In the extension of this first portion, there is the second portion of pad 302 which is generally frustoconical in shape and has no means of mechanical blocking or interaction with the wall facing it. This second portion of pad 302 extends from the depth P1 to the depth H (that is to say over a depth P2 equal to 40% of H, in this instance equal to 7 mm).

The base 30 of the pad 3 is circular and has a diameter D2 (in the present case D2 is equal to 10 mm) which is greater than the maximum diameter D0 of any section of the first portion of pad 301. By virtue of the frustoconical shape, widening towards the inside, of the second portion of pad 302, the elastic return forces of the rubber material are sufficient to return this pad to its place inside the tread in the desired position and without the pad protruding on the rolling surface.

In worthwhile variants, the diameter D2 of the base 30 of the pad is at least equal to 1.3 times the diameter D0 and at most equal to 2.5 times the same diameter D0.

Figure 2B:
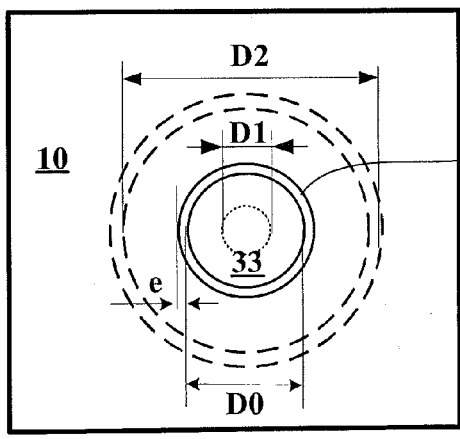
FIG. 2B shows the rolling surface of the tread shown in FIG. 1A.

FIG. 2B shows a view of the rolling surface of the rubber pad 3 shown in section in FIG. 2A. It shows the surface of contact 33 of the circular-shaped pad of diameter D0 and the incision 2 of generally circular shape and of average width e. The diameter D1 of the section of the pad 3 on the plane of junction J between the first portion of pad and the second portion of pad is less than the diameter D0.

Figure 3:
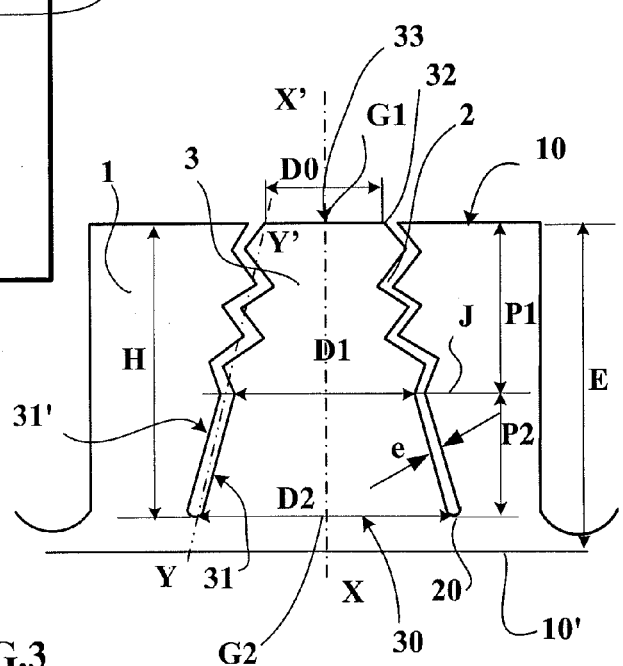
FIG. 3 shows a second variant of a pad according to the invention in which the general shape of the pad is frustoconical.

FIG. 3 shows a second variant of the pad 3 in which the incision 2 is supported by a generally frustoconical shape with a generatrix YY' passing through the innermost point and the outermost point. The first portion of pad 301 comprises means for interacting mechanically with the wall facing it and has a diameter D0 on the rolling surface in the new state and a maximum diameter D1 at the junction J with the second portion of pad 302. The angle of this generatrix YY' with the median axis XX' of the pad is 20° in this instance. The means for interacting mechanically with the wall facing it are in this instance zigzags formed as a helix around the first portion of pad.

FIG. 4 shows another variant of a pad according to the invention in which the first portion of pad is of generally cylindrical shape extended by a second portion of pad of doubly frustoconical shape. From the plane of junction J between the first and the second portion of pad, the second portion takes a frustoconical shape the sectional diameter of which increases until it takes a maximum value D2 (greater than the maximum diameter of the first portion of pad) in order subsequently to take a frustoconical shape the diameter of which decreases towards the base of the pad. In this variant, the doubly frustoconical shape does not generate blocking of the pad protruding on the rolling surface through its location close to the base of the pad because the elastic return forces of the material are determined to be sufficient to return the pad to the desired position.

The variant of FIG. 5 again uses the pad shown in FIG. 1 to which a channel is added surrounding the base of the pad. This channel 20' with a maximum sectional diameter greater than the width e of the incision 2 also helps with good stripping of the pad especially since it substantially enlarges the diameter of the base of the pad. The blocking means provided on the first portion of the incision 2 have a non-zero amplitude A while the second portion of the incision has no blocking means (this portion being rectilinear in sectional view).

In other variants not shown here, the median axis XX' of the pad as defined can make an angle other than 0° with a perpendicular to the rolling surface.

In another variant shown in FIG. 6, the intention is more particularly to ensure a transition between the first portion of pad and the second portion of pad. In this variant, the blocking means for blocking the walls of the pad of the first portion of pad with the wall facing it are formed by reliefs forming, in a sectional plane containing the axis XX', a broken line the amplitude of which decreases as it goes towards the surface of junction or connection with the second portion of pad (that is to say going towards the base of the pad). In the present case, the apex of the angle B formed between two straight lines tangential to the points of maximum amplitude of the broken lines is positioned inside the tread.

In the foregoing variants, the geometric paths, on the rolling surface 10 of the new tire, of the incisions 2 delimiting the rubber pads 3 have a circular shape: naturally, what has been described may apply to the application of different shapes: oval, elliptical, rectangular or other shapes. For the shapes having at least two axes of symmetry, it may be advantageous that the orientation of these axes varies going from the outer surface of the first portion of the pad to the base of the second portion of the pad as shown as an example in FIG. 7.

This FIG. 7 shows a view, on the rolling surface in the new state, of a rubber pad 3 which is delimited by an incision 2 and of which the surface of contact 33 has an elliptical shape with main axes T1, T2 (respectively large and small axes). Dashed lines indicate the geometry of the base of the pad, itself also elliptical and with main axes T1', T2'; in the present case, it is noted that the shape of the base of the pad is obtained by rotating the shape of the pad on the rolling surface. The angle of rotation of the main axis T1' relative to the axis T1 is in this instance greater than 45°. The axis of the pad is in this instance perpendicular to the rolling surface. This variant has the advantage of having an orientation of the incision and hence of the active ridges on the ground which is changeable with the level of wear of the tread.

In another variant not shown here, it is possible to have a pad delimited on the rolling surface in the new state by an incision with a first shape and at its base with another shape different from the first. It is possible, for example, to switch from a circular shape to an elliptical shape.

The invention is not limited to the examples described and shown and various modifications can be made thereto without departing from its context. For example and although all of the examples presented show rubber pads of which the surface of contact in the new state is at the same level as the rolling surface of the tread, it is easy to apply the same disclosure with a rubber pad of which the surface of contact is offset towards the inside of the tread relative to the surface of the tread. In another variant, the width of the incision delimiting the pad can be different between two portions of pad.

The invention claimed is:

1. A tire tread having a thickness (E) and provided with a rolling surface adapted to come into contact with the road surface during running, this tread comprising a plurality of rubber pads with a median axis XX' cutting the rolling surface of the tread, each rubber pad having a height H at most equal to the thickness (E) of the tread, comprising a lateral wall running around the pad about the axis XX', this lateral wall cutting the rolling surface along a ridge the geometric path of which on the rolling surface is closed, this ridge delimiting a face of contact of the pad with the road surface, the lateral wall of each pad being, at its base, connected by a connection portion for connection to a wall facing it, the lateral wall of the pad and the wall facing it delimiting an incision with an average width (e) and with a depth equal to the height (H), wherein the lateral wall of each pad and the lateral wall facing this lateral wall have:
on a first portion of the incision, of a depth (P1) at most equal to 60% of the depth (H) of the incision, blocking means designed to limit the movements of the lateral wall relative to the wall facing it, the blocking means consisting of geometric shapes of first amplitude provided on a wall in order to interconnect with or fit into the geometric shapes provided on the wall facing it,
and on a second portion of the incision, of a depth (P2) at most equal to 60% of the depth (H) of the incision and extending the first portion of depth (P1), geometric shapes of second amplitude or that are rectilinear (that is to say of zero amplitude), the second amplitude being less than the first amplitude,
wherein the maximum sectional surface area of the second portion of the pad is greater than the maximum sectional surface area of the first portion of the pad, where the first portion of the incision is delimiting a first portion of pad and the second portion of the incision is delimiting a second portion of pad,
wherein the sectional surface area at the base of the pad is greater than the sectional surface area of the pad at the connection between the first and second portions of the pad, and wherein the section of the second portion of the pad increases linearly between the connection and the base of the pad,
wherein the first portion of pad is of generally circular cylindrical shape and the second portion of pad is of generally frustoconical shape, this second portion of pad widening towards the base of the pad, and
wherein the ratio of the diameter (D2) of the base of the pad to the diameter (D0) of the pad on the rolling surface in the new state is at least equal to 1.3 and at most equal to 2.5.

2. The tread according to claim 1 wherein the wall delimiting the second portion of pad is deprived of any means of blocking with the wall facing it.

3. The tread according to claim 1 wherein the end of the incision in its innermost portion of the tread comprises a portion forming a channel surrounding the pad of a width greater than the width e of the incision.

4. The tread according to claim 1 wherein the shape of the incision delimiting a pad of the surface is elliptical with main axes T1, T2 and the base of the same pad has an elliptical shape with main axes T1', T2', the main axis T1' forming an angle other than 0 degrees with the main axis T1.

5. The tread according to claim 1 wherein the axis XX' of the pad is inclined at an angle other than 90 degrees with a perpendicular to the rolling surface.

6. A tire tread having a thickness (E) and provided with a rolling surface adapted to come into contact with the road surface during running, this tread comprising a plurality of rubber pads with a median axis XX' cutting the rolling surface of the tread, each rubber pad having a height H at most equal to the thickness (E) of the tread, comprising a lateral wall running around the pad about the axis XX', this lateral wall cutting the rolling surface along a ridge the geometric path of which on the rolling surface is closed, this ridge delimiting a face of contact of the pad with the road surface, the lateral wall of each pad being, at its base, connected by a connection portion for connection to a wall facing it, the lateral wall of the pad and the wall facing it delimiting an incision with an average width (e) and with a depth equal to the height (H), wherein the lateral wall of each pad and the lateral wall facing this lateral wall have:

on a first portion of the incision, of a depth (P1) at most equal to 60% of the depth (H) of the incision, blocking means designed to limit the movements of the lateral wall relative to the wall facing it, the blocking means consisting of geometric shapes of first amplitude provided on a wall in order to interconnect with or fit into the geometric shapes provided on the wall facing it, and on a second portion of the incision, of a depth (P2) at most equal to 60% of the depth (H) of the incision and extending the first portion of depth (P1), geometric shapes of second amplitude or that are rectilinear (that is to say of zero amplitude), the second amplitude being less than the first amplitude, and wherein the maximum sectional surface area of the second portion of the pad is greater than the maximum sectional surface area of the first portion of the pad, where the first portion of the incision is delimiting a first portion of pad and the second portion of the incision is delimiting a second portion of pad, wherein the means for blocking the walls of the pad of the first portion of pad with the wall facing it are formed by reliefs forming, in a sectional plane containing the axis XX', a broken line the amplitude of which decreases towards the base of the pad.

7. The tread according to claim 6 wherein the wall delimiting the second portion of pad is deprived of any means of blocking with the wall facing it.

8. The tread according to claim 6 wherein the end of the incision in its innermost portion of the tread comprises a portion forming a channel surrounding the pad of a width greater than the width e of the incision.

9. The tread according to claim 6 wherein the shape of the incision delimiting a pad of the surface is elliptical with main axes T1, T2 and the base of the same pad has an elliptical shape with main axes T1', T2', the main axis T1' forming an angle other than 0 degrees with the main axis T1.

10. The tread according to claim 6 wherein the axis XX' of the pad is inclined at an angle other than 90 degrees with a perpendicular to the rolling surface.

11. A tire tread having a thickness (E) and provided with a rolling surface adapted to come into contact with the road surface during running, this tread comprising a plurality of rubber pads with a median axis XX' cutting the rolling surface of the tread, each rubber pad having a height H at most equal to the thickness (E) of the tread, comprising a lateral wall running around the pad about the axis XX', this lateral wall cutting the rolling surface along a ridge the geometric path of which on the rolling surface is closed, this ridge delimiting a face of contact of the pad with the road surface, the lateral wall of each pad being, at its base, connected by a connection portion for connection to a wall facing it, the lateral wall of the pad and the wall facing it delimiting an incision with an average width (e) and with a depth equal to the height (H), wherein the lateral wall of each pad and the lateral wall facing this lateral wall have:

on a first portion of the incision, of a depth (P1) at most equal to 60% of the depth (H) of the incision, blocking means designed to limit the movements of the lateral wall relative to the wall facing it, the blocking means consisting of geometric shapes of first amplitude provided on a wall in order to interconnect with or fit into the geometric shapes provided on the wall facing it, and on a second portion of the incision, of a depth (P2) at most equal to 60% of the depth (H) of the incision and extending the first portion of depth (P1), geometric shapes of second amplitude or that are rectilinear (that is to say of zero amplitude), the second amplitude being less than the first amplitude, and wherein the maximum sectional surface area of the second portion of the pad is greater than the maximum sectional surface area of the first portion of the pad, where the first portion of the incision is delimiting a first portion of pad and the second portion of the incision is delimiting a second portion of pad, wherein the first portion of pad is of generally circular cylindrical shape and the second portion of pad is of generally frustoconical shape, this second portion of pad widening towards the base of the pad, and wherein the ratio of the diameter (D2) of the base of the pad to the diameter (D0) of the pad on the rolling surface in the new state is at least equal to 1.3 and at most equal to 2.5.

\* \* \* \* \*